United States Patent [19]
Yamada et al.

[11] Patent Number: 5,693,925
[45] Date of Patent: Dec. 2, 1997

[54] DISPLACEMENT DETECTING SWITCH DEVICE

[75] Inventors: Kenichi Yamada; Hirotoshi Utsunomiya; Takashi Nakazawa, all of Tokyo, Japan

[73] Assignees: Fuji Jukogyo Kabushiki Kaisha; Niles Parts Co., Ltd., both of Tokyo, Japan

[21] Appl. No.: 637,354

[22] Filed: Apr. 24, 1996

[30] Foreign Application Priority Data

May 12, 1995 [JP] Japan .................. 7-138466

[51] Int. Cl.$^6$ .................. H01H 9/06; H01H 21/78
[52] U.S. Cl. .................. 200/61.88; 200/11 G
[58] Field of Search .................. 200/61.85, 61.86, 200/61.88, 61.91, 302.1, 11 G, 11 J, 11 E, 11 EA; 192/89.22

[56] References Cited

U.S. PATENT DOCUMENTS

| | | | |
|---|---|---|---|
| 4,296,286 | 10/1981 | Richardson | 200/61.88 |
| 5,338,907 | 8/1994 | Baker et al. | 200/61.88 |
| 5,525,768 | 6/1996 | Cobb, III et al. | 200/61.88 |

FOREIGN PATENT DOCUMENTS

| | | |
|---|---|---|
| 1 226 600 | 3/1971 | United Kingdom . |
| 1 293 754 | 10/1972 | United Kingdom . |
| 1 483 852 | 8/1977 | United Kingdom . |
| 2 212 981 | 8/1989 | United Kingdom . |

*Primary Examiner*—Peter S. Wong
*Assistant Examiner*—Bao Q. Vu
*Attorney, Agent, or Firm*—Flynn, Thiel, Boutell & Tanis, P.C.

[57] ABSTRACT

A displacement detecting switch device is assembled with ultrasonic welding techniques, so that easiness of assembling work for it is further increased. The device comprises a switch body including a cover body and a base plate; an operation lever disposed pivotably outside of the switching body; and a movable plate disposed inside of the switch body and linked with the operation lever. There are disposed a first joint portion and a second joint portion formed by ultrasonic welding between the cover body and the base plate and between the operation lever and the movable plate, respectively.

7 Claims, 2 Drawing Sheets

DISPLACEMENT DETECTING SWITCH DEVICE

FIELD OF THE INVENTION

The present invention relates to an improvement of a displacement detecting switch device such as a so-called inhibitor switch device, etc. for detecting a transmission operation position in an automatic transmission for a vehicle, and in particular to techniques for improving easiness of assembling work at assembling the displacement detecting switch device.

DESCRIPTION OF THE PRIOR ART

Heretofore, in this kind of displacement detecting switch devices, as disclosed e.g. in JP Utility Model-A-Sho 58-101428, JP Utility Model-A-Hei 3-64431, etc., when assembling a switch body composed of a cover body and a base plate, a waterproof structure is formed by using sealing material or an O-ring on either one of joining surfaces opposite to each other of the cover body and the base plate, which are secured to each other by using screws.

As described above, in a prior art displacement detecting switch device, when assembling a switch body composed of a cover body and a base plate, the cover body and the base plate are secured to each other by using screws and further a waterproof structure is formed therebetween by using sealing material or an O-ring. For this reason, when assembling the switch body composed of the cover body and the base plate, there are problems that assembling work therefor is complicated and that a number of parts are required.

SUMMARY OF THE INVENTION

The present invention has been made in order to solve the problems as described above and the object thereof is to provide a displacement detecting switch device wherein assembling work is further facilitated by forming the joint place by ultrasonic welding techniques at assembling the displacement detecting switch device.

A displacement detecting switch device of the present invention is characterized by employment of a switch body constructed with a cover body and a base plate; an operation lever disposed pivotably outside of the switch body; and a movable plate disposed inside of the switch body and linked with the operation lever and it comprises further a first joint portion where the cover body and the base plate are jointed by ultrasonic welding. Therefore, it is possible to facilitate assembling work efficiency by forming the first joint portion with ultrasonic welding at assembling the switch body composed of the cover body and the base plate.

A displacement detecting switch device of the present invention is further characterized in that the first joint portion is disposed closely to a place where the operation lever is disposed. Accordingly, jointing the cover body with the base plate at the first joint portion by ultrasonic welding effected by using a horn for ultrasonic welding can be performed easily from the side, where the operation lever is disposed, using the base plate as a receiving jig without using any special receiving jig.

A displacement detecting switch device of the present invention is also characterized in that it comprises further a second joint portion where the operation lever and the movable plate are jointed by ultrasonic welding and that a member having no ultrasonic weldability is interposed between the movable plate and the base plate. Therefore, the member having no ultrasonic weldability can be used as a receiving member at jointing at the second joint portion effected by using the horn for ultrasonic welding and further the member having no ultrasonic weldability acts as a receiving member so as to prevent the movable plate and the base plate from ultrasonic welding at jointing the second joint portion.

A displacement detecting switch device of the present invention is further characterized in that the member having no ultrasonic weldability is made of metal. Therefore, it is possible to prevent easily ultrasonic welding of the movable plate with the base plate also at jointing the operation lever with the movable plate at the second joint portion by ultrasonic welding.

A displacement detecting switch device of the present invention is furthermore characterized in that the member having no ultrasonic weldability is constructed by a part of an electrically conductive plate made by insert formation into the base plate. Therefore, it is unnecessary to dispose any member having no ultrasonic weldability in the form of a separate member so that the number of parts can be reduced.

DESCRIPTION OF THE PREFERRED EMBODIMENTS

Figure 1:
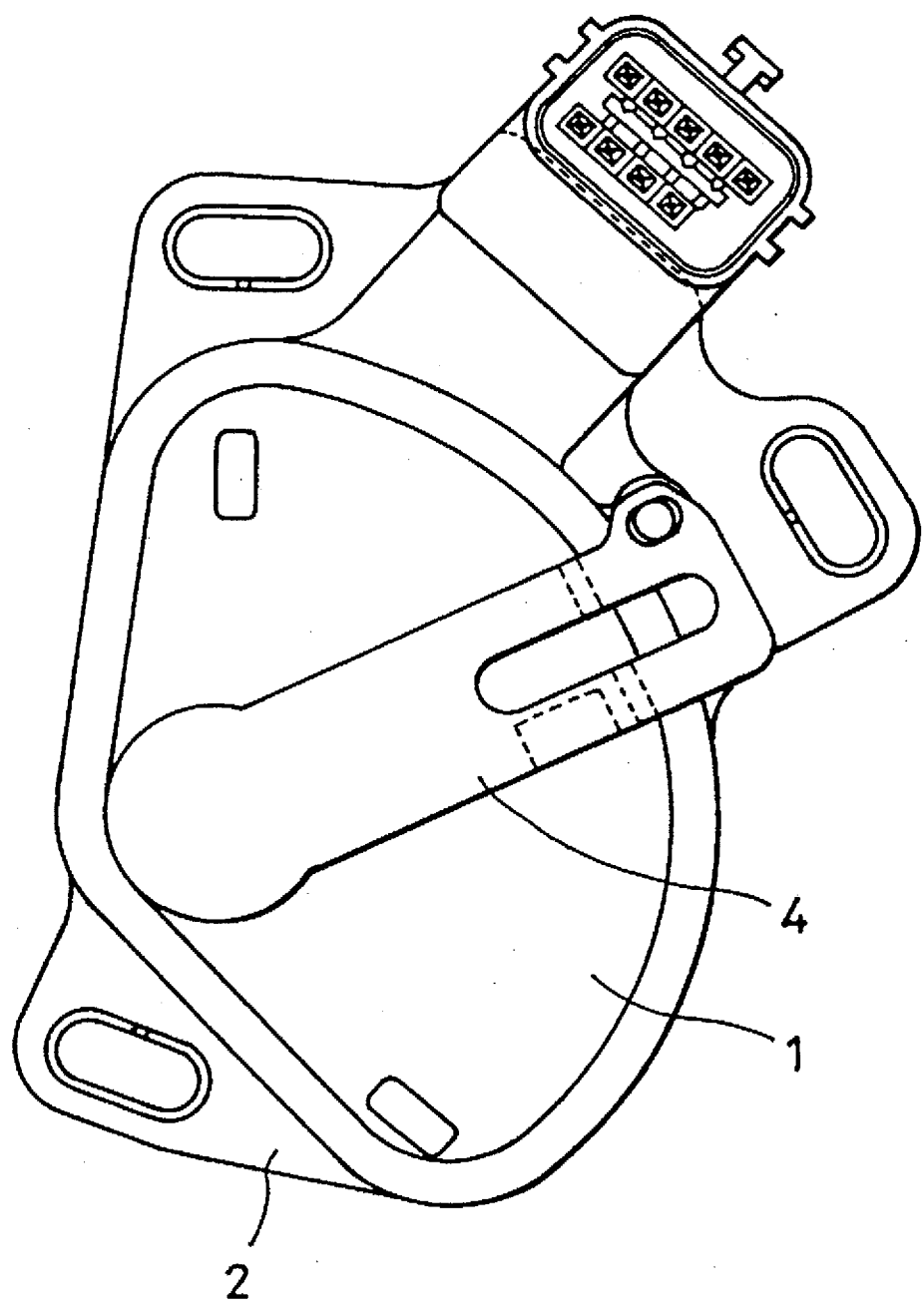
FIG. 1 is a top view showing a displacement detecting switch device, which is an embodiment of the present invention.
Figure 2:
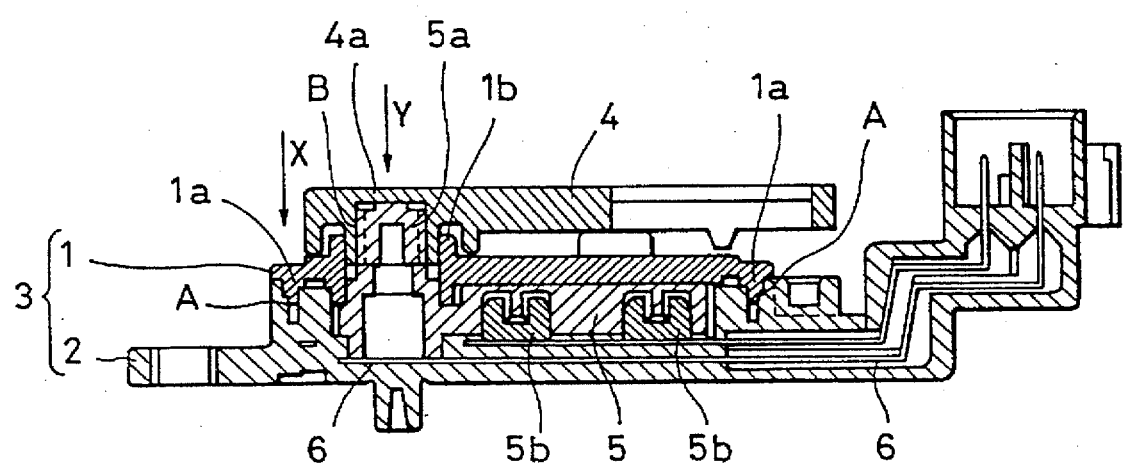
FIG. 2 is a cross-sectional view showing the displacement detecting switch device indicated in FIG. 1.

Hereinbelow an embodiment of the present invention will be explained. FIG. 1 is a top view of a displacement detecting switch device, which is an embodiment of the present invention and FIG. 2 is a cross-sectional view of the displacement detecting switch device indicated in FIG. 1. In FIG. 1 and FIG. 2, reference numeral 1 represents a cover body, which is formed approximately in a flat plate shape, made of a resin material. Reference numeral 2 represents a base plate, which is formed approximately in a frame shape, made of a resin material. A peripheral portion 1a formed along all the periphery of the lower surface of the cover body 1 is jointed with a peripheral portion formed on the upper surface of the base plate 2, corresponding thereto, by ultrasonic welding effected by using a horn for ultrasonic welding not indicated in the figures. This joint portion is represented as a first joint portion A. The cover body 1 and the base plate 2 jointed by ultrasonic welding, as described above, constitute a switch body 3 having a closed inner space.

Reference numeral 4 represents an operation lever disposed pivotably outside of the switch body 3, the lever made of a resin material being formed approximately in a rod shape. Reference numeral 5 represents a movable plate disposed within the inner space in the switch body 3, the movable plate made of a resin material being formed approximately in a flat plate shape. Reference numeral 5a represents a protruding boss made in one body on one side surface of one end portion of the movable plate 5, which passes through an opening portion 1b formed in the cover body 1 to protrude outward from the switch body 3. The protruding boss 5a of the movable plate 5 is engaged with a recessed groove 4a formed in one end portion of the operation lever 4. The inner surface of the recessed groove 4a is jointed with the outer surface of the protruding boss 5a of the movable plate 5 by ultrasonic welding effected by using a horn for ultrasonic welding not shown in the figures. This joint portion is represented as a second joint portion B. Reference numeral 5b represents a movable contact disposed, elastically urged towards the lower surface of the movable plate 5. Reference numeral 6 represents an electrically conductive plate (fixed contact) made by insert formation into the base plate 2. Switching operation of a circuit is effected between the movable contact 5b and the fixed contact 6 by pivoting operation of the operation lever 4. As indicated in FIG. 2, a part of the electrically conductive plate 2 is extended so as to be a member interposed between a lower surface, opposite to the second joint portion B, of the movable plate 5 and the base plate 2.

In the displacement detecting switch device having a construction as described above, as indicated in FIG. 2, process of assembling the switch body composed of the cover body 1 and the base plate 2 is explained hereinafter. In order to joint the peripheral portion 1a formed along all the periphery of the lower surface of the cover body with the peripheral portion of the upper surface of the base plate 2 corresponding thereto, first the horn for ultrasonic welding not shown in the figure is brought into contact with the upper surface portion of the cover body 1 opposite to the peripheral portion 1a of the lower surface of the cover body 1 in the direction indicated by an arrow X in FIG. 2. Then, jointing is effected by ultrasonic welding by applying ultrasound thereto. For ultrasonic welding, the base plate 2 acts as a receiving jig. Jointing at the first joint portion A is achieved in this way. In this case the first joint portion A is provided closely to the side where the operation lever 4 is disposed.

Next, when the operation lever 4 disposed pivotably outside of the switch body 3 is jointed with the movable plate 5 disposed within the inner space of the switch body 3, as indicated in FIG. 2, the protruding boss 5a of the movable plate 5 passing through the opening portion 1b of the cover body 1 to protrude outward from the switch body 3 is engaged with the recessed groove 4a formed in the end portion of the operation lever 4. And then, the horn for ultrasonic welding not indicated in the figure is brought into contact with the upper surface portion of the operation lever 4 opposite to the bottom surface of the recessed groove 4a in the direction indicated by an arrow Y in FIG. 2. Jointing of the operation lever 4 with the protruding boss 5a of the movable plate 5 is effected by ultrasonic welding by applying ultrasound thereto. Jointing at the second joint portion B is achieved in this way. At jointing at the second joint portion B, a member having no ultrasonic weldability, i.e. a member extended, which is a part of the electrically conductive plate 6 made by insert formation into the base plate 2, is interposed between the lower surface of the movable plate 5 and the base plate 2. For this reason, also at jointing at the second joint portion B by ultrasonic welding of the operation lever 4 with the movable plate 5 effected by using the horn for ultrasonic welding not indicated in the figure, since the member, which is a part of the electrically conductive plate 6, acts as a receiving member or jig to prevent ultrasonic welding of the lower surface of the movable plate 5 with the base plate 2.

As described above, in the displacement detecting switch device according to the present invention, as indicated in FIG. 2, at first the cover body 1 and the base plate 2 constituting the switch body 3 are jointed at the first joint portion A by ultrasonic welding effected by using the horn for ultrasonic welding not shown in the figure. The first joint portion A is provided closely to the side, where the operation lever 4 is disposed. For this reason, ultrasonic welding can be effected easily from the side, where the operation lever 4 is disposed, by using the base plate 2 as a receiving member or jig and the horn for ultrasonic welding. As described above, at jointing at the first joint portion A according to the present invention, an advantage is obtained that welding can be effected simply and easily without using any receiving jig having a refuge recess for the operation lever, which was needed heretofore at this kind of welding.

Next, after jointing at the first joint portion A, jointing of the operation lever 4 with the movable plate 5 is made at the second joint portion B by ultrasonic welding effected by using a horn for ultrasonic welding not indicated in the figure. At jointing at the second joint portion B, welding is effected by using the base plate 2, which is already jointed with the cover body 1 at the first joint portion A, as a receiving jig. Further, at jointing at the second joint portion B, a member having no ultrasonic weldability, i.e. a member extended, which is a part of the electrically conductive plate 6 made by insert formation into the base plate 2, is interposed between the lower surface of the movable plate 5 and the base plate 2. For this reason, since the member, which is a part of the electrically conductive plate 6, serves as a receiving member or jig for the movable plate 5, at jointing at the second joint portion B, advantage is obtained that it is possible to prevent easily careless ultrasonic welding of the lower surface of the movable plate 5 with the base plate 2.

Further, at jointing at the first joint portion A where the cover body 1 is jointed with the base plate 2 and also at jointing subsequently at the second joint portion B where the operation lever 4 is jointed with the movable plate 5, in both the two cases, the horn for ultrasonic welding not shown in the figure is brought from the side where the operation lever 4 is disposed into contact with the upper surface of the cover body 1 and then the upper surface of the operation lever 4 and jointing is effected by ultrasonic welding by applying ultrasound thereto. As the result, at jointing at the first joint portion A and at jointing subsequently at the second joint portion B, the present invention is characterized in that the jointing can be effected extremely simply and easily, as described above, neither by using any special receiving jig, in which a refuge recess is disposed for the operation lever, needed depending on the kind of joint positions in the prior art nor by effecting any complicated operations such an operation that members to be jointed are set up-side-down on the receiving jig, etc. Further, at jointing at the first joint portion A, since it is not necessary to use any special receiving jig as described above for the operation lever 4, the present invention is characterized in that it is possible to design the switch body 3 without being influenced by the size of the operation lever 4 and that the switch body 3 can be made further smaller with respect to prior art one.

As described above, according to the present invention, when the switch body composed of the cover body and the base plate is assembled, easiness of assembling work is further increased in comparison with such prior art techniques that jointing is effected by screwing, owing to the fact that jointing at the first joint portion is achieved by ultrasonic welding using a usual horn for ultrasonic welding without using any separate receiving jig.

According to the present invention, it is possible to easily effect jointing of the cover body with the base plate at the first joint portion by ultrasonic welding using a usual horn for ultrasonic welding from the side where the operation lever is disposed, using the base plate as a receiving jig.

According to the present invention, at jointing at the second joint portion, effected by using a usual horn for ultrasonic welding, the member having no ultrasonic weldability can be used as a receiving member and further this receiving member can prevent ultrasonic welding at portions other than the second joint portion.

In addition, also jointing at the second joint portion, effected by using a usual horn for ultrasonic welding, similarly to ultrasonic welding at jointing at the first joint portion, can be effected easily without using any special receiving jig and further from the side where the operation lever is disposed. In addition, it is possible to design the switch body, independently from the size of the operation lever and therefore to make the switch body further smaller.

According to the present invention, at jointing at the second joint portion, effected by using a usual horn for ultrasonic welding, it is possible to prevent ultrasonic welding of the movable plate with the base plate owing to existence of the member made of a metal having no ultrasonic weldability.

According to the present invention, since a part of the electrically conductive plate of the switch body can be used also as the member having no ultrasonic weldability, it is not necessary to dispose any member having no weldability in the form of a separate member and thus it is possible to decrease the number of parts.

What is claimed is:

1. A displacement detecting switch having: a main case formed from a base plate that is covered by a cover body; a movable plate disposed in said main case; an electrically conductive plate secured to the base plate in said main case so that the movable plate contacts the electrically conductive plate; and an operation lever located outside of the main case for displacing the movable plate relative to the electrically conductive plate, the improvement wherein:

the cover body is formed with a protrusion that protrudes from a mating surface of the cover body towards the base plate for evenly contacting a peripheral surface of the base plate, wherein the cover plate is ultrasonically welded to the base plate to permanently connect the cover body to the base plate; and the movable plate is provided with a boss that extends from an end of the movable plate through the cover body that is ultrasonically welded to the operation lever for permanently securing the operation lever to the movable plate.

2. The displacement detecting switch of claim 1, wherein there is a member formed of material that cannot be ultrasonically welded located in the main case between the movable plate and the base plate.

3. The displacement detecting switch of claim 2, wherein said member formed of material that cannot be ultrasonically welded is formed from metal.

4. The displacement detecting switch of claim 2, wherein said member formed of material that cannot be ultrasonically welded is part of the electrically conductive plate.

5. A method of manufacturing a displacement detecting switch having: a main case formed from a base plate and a cover body; a movable plate disposed in the main case; an electrically conductive plate in the main case secured to the base plate so that the movable plate contacts the electrically conductive plate; and an operation lever located outside of the main case for displacing the movable plate relative to the electrically conductive plate, the method including the steps of:

providing the cover body with a protrusion that extends from a mating surface of the cover body towards the base plate;

providing an end of the moving plate with a boss and the cover plate with a complementary opening;

seating the protrusion of the cover body evenly with a peripheral surface of the base plate, where as a result of positioning of the cover body, the boss of the moving plate extends through the opening in the cover plate;

permanently connecting the cover body to the base plate by ultrasonically welding the cover body to the base plate; and ultrasonically welding the operation lever to the boss of the movable plate so as to permanently secure the operation lever to the movable plate.

6. The method of manufacturing a displacement detecting switch of claim 5, further including the step of positioning a member between the movable plate and the base plate that cannot be ultrasonically welded to the movable plate prior to said ultrasonically welding of the operation lever to the boss of the movable plate.

7. The method of manufacturing a displacement detecting switch of claim 6, wherein said member placed between the movable plate and the base plate is the electrically conductive plate.

* * * * *